United States Patent [11] 3,604,034

[72] Inventor Walter Hermann Leistner
 97 Alamosa Drive, Willowdale, Ontario, Canada
[21] Appl. No. 789,449
[22] Filed Jan. 7, 1969
[45] Patented Sept. 14, 1971

[54] METHOD AND APPARATUS FOR MAKING NAILS WITH FLAT CIRCULAR HEADS
10 Claims, 8 Drawing Figs.

[52] U.S. Cl. .................................................. 10/46, 10/49, 10/54
[51] Int. Cl. .................................................. B21g 3/20, B21g 3/28
[50] Field of Search .......................................... 10/43, 46, 49, 54, 86; 85/20

[56] References Cited
UNITED STATES PATENTS
| 457,237 | 8/1891 | Tyers | 10/43 |
| 1,964,988 | 7/1934 | Hill | 10/46 |
| 2,037,235 | 4/1936 | Hill | 10/46 |
| 2,821,727 | 2/1958 | Corckran | 10/46 |

FOREIGN PATENTS
| 7,686 | 5/1888 | Great Britain | 10/43 |
| 653,004 | 11/1937 | Germany | 10/46 |
| 659,082 | 9/1938 | Germany | 10/46 |

Primary Examiner—Charles W. Lanham
Assistant Examiner—E. M. Combs
Attorney—George A. Rolston ABSTRACT: Apparatus and a method for making nails with flat circular heads and a shank of a noncircular cross-sectional shape and the method comprises: unwinding drawn wire from a roll of wire and advancing the wire by an intermittent drive means; passing the wire through guide means to provide a straight length of wire; engaging a portion of the wire with die means to form a cylindrical portion on the wire having a circular cross-sectional shape and a length substantially sufficient to form the head of the nail; feeding the wire into a nail-making machine wherein the head is formed from the cylindrical portion and shearing the nail off at the end of the shank to form the nail.

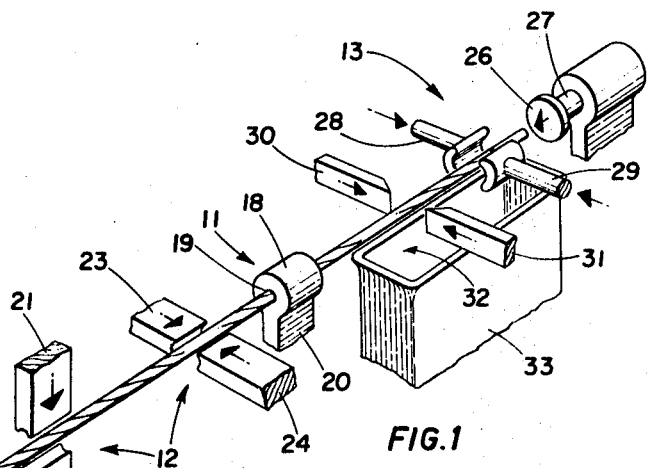
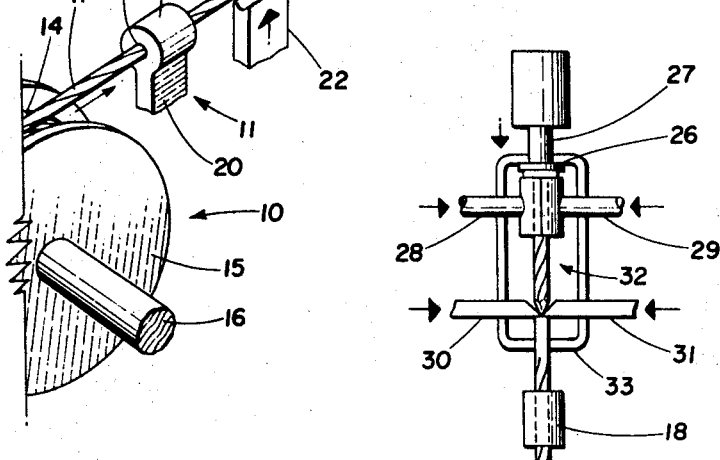
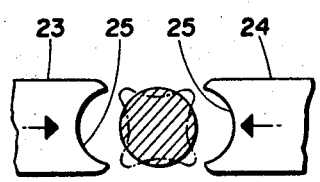
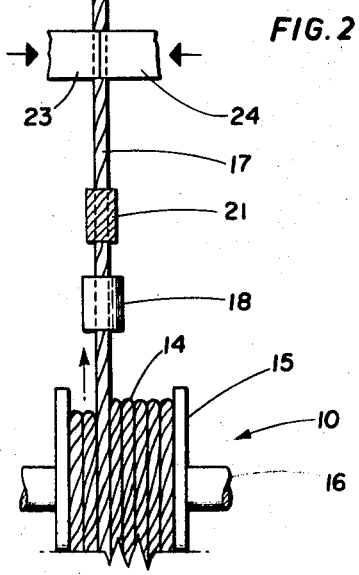
FIG. 1
FIG. 2
FIG. 6
Inventor
WALTER H. LEISTNER
by: George A. Rolston.

PATENTED SEP 14 1971

Inventor
WALTER H. LEISTNER by: George A. Rolston.

METHOD AND APPARATUS FOR MAKING NAILS WITH FLAT CIRCULAR HEADS

This invention relates to a new and useful method and apparatus for making nails with flat circular heads from drawn wire with a general cross-sectional shape which is noncircular and of which the orientation varies helically along the length of the wire.

It is well known in the art to use conventional circular wire which has a general cross-sectional shape which is uniform and uniformly oriented along the length of the wire and can be drawn in any desired cross-sectional shape for making wire articles such as round head nails or the like. Apparatus has been devised for drawing wire which is known as helical wire having a general cross-sectional shape which is noncircular and of which the orientation varies helically along the length of the wire such as disclosed in the U.S. Pat. No. 2,928,525 issued on Mar. 15, 1960 to R. M. Kelday et al. entitled WIRE DRAWING DIE.

Helical wire articles have in practice been produced in one of three ways, all involving special operations on conventional drawn wire. One way, used in the manufacture of so-called threaded nails, has been to roll completed nails made from conventional round wire between two angularly ribbed plates or curved surfaces, thus rolling helical grooves into the nails. Another way, used in the manufacture of threaded nails and also in the production of other articles required to be formed of helical wire, has consisted of helically twisting conventional wire of noncircular cross section about its longitudinal axis. The first way of helixing is essentially batch as opposed to continuous operations, and involves very substantial expense, with result that, for example, the cost of threaded nails is very substantially greater than that of comparable ordinary nails. Moreover, the rolling operation tends to alter at least the desired surface structure imparted to the article by cold drawing, with the result that, for example, it no longer exhibits cold drawn characteristics over its whole surface. The twisting operation can be carried out only on relatively soft wire; it sets up torsional stresses in the article and tends to distort it.

As is described in the above-noted U.S. Patent, it is well known to have continuous production of helixed wire where the wire is shaped and helixed in a single operation by drawing it through a rotatable die of which the general cross section shape is noncircular over at least a substantial part of its working length and which is helically twisted about its longitudinal axis throughout the portion of noncircular cross section shape. This helical wire has all the desirable qualities of conventional drawn wire.

Conventional drawn wire is suitable for use with a nail-making machine which is well known in the art for producing headed wire nails and comprises a wire-feeding mechanism, clamping dies for holding the wore during the heading or upsetting operation, upsetting mechanism for forming the head on the nail and cooperative shearing members or blades for severing the wire at the completion of the formation of the nails. The heads formed on the conventional nails are normally of uniform thickness and circular in shape.

When helical wire is fed into a conventional nail-making machine, a circular head on the nail is not possible. This is because the cross-sectional shape of the wire is uniform along the length of the wire with its orientation varying helically along the length or the cross-sectional shape or area, or both may be different at different points along the length of the wire. If the cross-sectional shape is uniform the helical variation of its shape is of a uniform area along the length of the wire and the cross-sectional shape and area is uniform along the length. Where the cross-sectional shape or area or both are different at different points, then the helical variation of its shape is also different along the length of the wire, and the cross-sectional shape and area is not uniform along the length. When helical wire is used with a conventional nail-making machine the head produced does not have a circular head but a head shaped like two hemispheres placed together on their flat side with their adjacent corners spaced apart forming sharp projecting portions. To obtain a perfectly circular head on this nail would require manually grinding the excess material away which would increase the cost of manufacture of this type of nail.

It is desirable to use a stick of these nails with a pneumatic gun which is available commercially to drive nails into workpieces. The pneumatic guns available are adjusted for use with conventional nails and circular heads. The hammer portion of the gun which drives the nail into the workpiece has a circular recess therein to receive the rounded head of the nail. The prior art helical nails produced from the helical wire have a head with a ragged circumferential edge and do not always seat properly in the recess. In addition, when a helical nail is driven into a workpiece, it rotates. With the prior art helical nails the ragged portions on the head catch on the side walls of the circular recess and the nail does not rotate as desired, sometimes jamming the gun. In addition, even where the nail is driven into the workpiece without being rotated the nail is not securely held therein. The nail is apt to came out of the hole more easily then if driven in properly. Nails made from helical wire are preferred to the conventional nails as the helical shaping on the shank of the nail produces a nail which is more securely held in the workpiece when properly driven therein. It is therefore more desirable to have a helical nail with a circular head which will fit in the circular recess in the hammer portion of the gun. The circular head permits the nail to rotate as it is being driven into the workpiece.

According to this invention a novel apparatus and method is provided which produces a circular head on a helical nail. The apparatus is provided in combination with a nail-making machine. Before the nail is made, the helical wire is passed through this apparatus which reduces the portion of the wire to be made into the head from a helical cross-sectional shape to cylindrical portion having a circular cross-sectional shape. The remaining portion of the helical wire between the cylindrical portions becomes the shank of the nail and the cylindrical portion of the nail becomes the circular head.

A preferred embodiment of the invention will now be described by way of example only with reference to the following drawings in which like reference devices refer to like parts thereof throughout the various views and diagrams and in which;

FIG. 1 is a perspective illustration of a schematic machine according to the present invention;

FIG. 2 is a top view of the schematic machine with the nail machine forming the nail according to the present invention;

Figure 7:
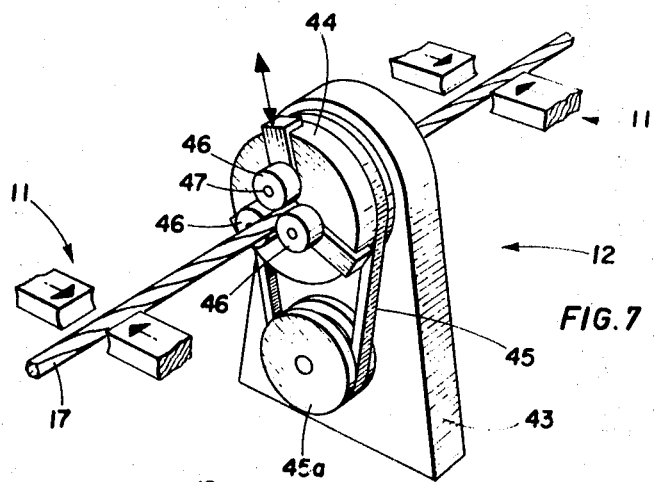
Figure 8:
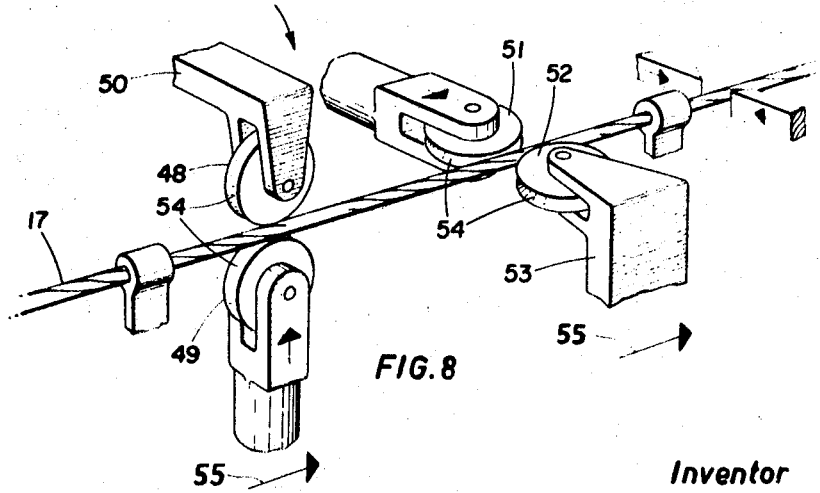

FIG. 6, on the first page of the drawings is an end view showing the dies acting on the helical wire to form the circular cross-sectional shape of the cylindrical portion;

FIG. 7 is a schematic drawing of an alternate construction of a means for producing a cylindrical portion on the helical wire; and FIG. 8 is another alternate device for the same purpose.

Referring to the accompanying drawings in detail which illustrates schematically a wire-feeding means 10, a guide apparatus means 11, an apparatus for forming a cylindrical portion on the helical wire 12, and a nail-making machine 13.

The wire-feeding means 10 comprises a roll of helical wire 14 wound on rotatable support apparatus 15 which is axially positioned on a shaft 16. A length of wire 17 is rolled off the roll of wire 14 and fed through a guide apparatus 11 which consists of two spaced-apart circular bars 18 with aligned axial openings 19 therethrough. The circular bars 18 are rigidly supported by support means 20 so the axial openings 19 are in the same plane. Thus the helical wire 17 between the bars 18 is straight for reasons which will be explained later.

The forming apparatus for reshaping the helical portion into a cylindrical portion 12 comprises a first pair of opposed dies 21 and 22 at a first station which are movable towards the wire 17 and away from the wire 17 in the vertical plane and a second pair of opposed dies 23 and 24 at a second station movable in the horizontal plane. The second station is registered a nail length away from the first station. The second pair of opposed dies 23 and 24 move towards and away from the wire 17 in the horizontal plane. Die heads 25 on each of the dies 21 to 24 have a semicylindrical inner profile as shown in FIG. 6 to provide a circular cross-sectional shape over a cylindrical portion of the wire 17. The length of wire between the cylindrical portions having helical cross-sectional shape forms the shank of the nail as will be described later.

The nail-heading machine 13 is well known in the art and is not described herein. Basically, a hammerhead 26 is fixed upon a movable shaft 27 connected to power means (not shown) in the machine 13. The shaft 27 moves from a normal position to a head-forming position. At the forward end of the machine 13 are two jaws 28 and 29 arranged for lateral movement towards and away from the wire 17 in the horizontal plane. The jaws 28 and 29 engage the wire 17 at one end of the cylindrical portion which is formed into the head. The wire 17 is clamped between the jaws 28 and 29 during the formation of the head on the nail. Shearing members 30 and 31 are positioned a distance equal to the desired length of the nail from the head-forming apparatus and shear the wire 17 at approximately the other end of the cylindrical portion of the wire 17. The shear members 30 and 31 are operated to sever the nail with preferably a sharp point at its cut end. After the nail has been cut off from the wire 17, the jaws 28 and 29 are laterally moved away from the nail and the nail drops into an inlet opening 32 of a bin 33.

Figure 3:
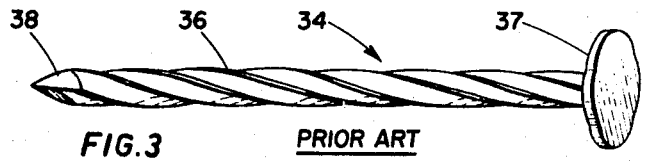
FIG. 3 is a perspective of the prior art type of helical nail which is produced by the conventional nail-making machine.

From FIG. 3, it will be seen that the prior art nails generally indicated at 34 comprise a shank portion 36, a transversely disposed head 37 at one end of the shank portion 36 and a pointed end 38 at the opposite end of the shank portion 36 from the head 37. The head 37 of a nail formed according to the prior art in a conventional machine has ragged portions are illustrated in FIG. 3. The helical wire 17 makes up the shank portion 36. Preferably when the nail 34 is being driven into a workpiece by a pneumatic gun (not shown) the nail 34 is rotated. The head 37 must also rotate but often the ragged projecting portions catch on the walls of the circular recess of the driving head of the pneumatic gun and the nail 34 does not rotate when being driven in.

Figure 4:
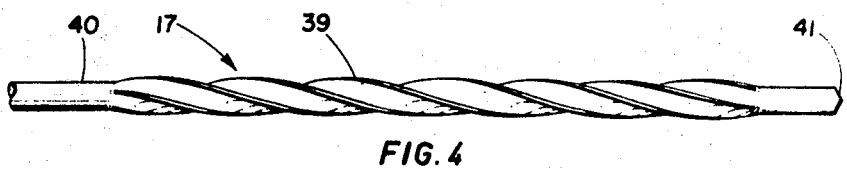
FIG. 4 is a plan view of a portion of helical wire and a portion of cylindrical wire formed according to the present invention.
Figure 5:
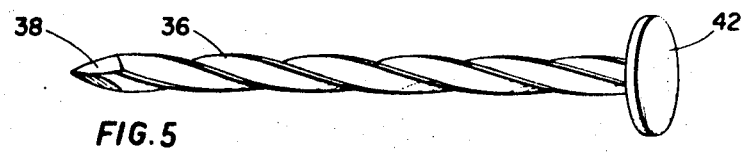
FIG. 5 is a plan view of a nail made according to the invention with a helical shank and a pointed end and a circular head.

FIG. 4 shows the helical wire 17 with a helical portion 39 and a cylindrical portion 40. An end surface 41 is formed at one end of the wire 17 when the shearing members 30 and 31 shear off the nail 34 from the end of the wire 17. The nail 34 produced by the novel method using the cylindrical portion reshaping apparatus 12 shown in figure 5 with a circular head 42, shank portion 36 of helical wire and a pointed end 38.

In operation, a well-known mechanism (not shown) controls the movement of the wire 17 through the stations. The travel of the wire 17 is intermittent and the wire 17 travels a distance equal to the length of a nail every time the feeding mechanism moves the wire 17 towards the nail-making machine 13. The movement of the feeding mechanism may be controlled by a Geneva movement (not shown), if desired, to provide the intermittent movement of the wire 17. In accordance with the invention, when the wire 17 is stopped at each cylindrical portion forming station the wire is engaged by dies 21 and 22 at the first station and the dies 23 and 24 at the second station. Each pair of dies move together when the wire 17 is stopped and move apart when the feeding mechanism is advancing the wire 17. The feeding mechanism operates in sequence with the cylindrical portion reshaping apparatus 12 and the nail-making machine 13 for the formation of successive nails.

The wire 17 is manually or automatically fed off the roll of wire 14 and through the first guide apparatus 11, then through the cylindrical portion reshaping apparatus 12 and and through the second guide apparatus 11 to the nail-making machine 13. The first and second guide apparatus 11 are aligned to keep the wire 17 straight when each pair of dies makes contact with the wire 17. The vertical movement dies 21 and 22 are registered a nail length away from the horizontal movement dies 23 and 24 and the dies 21 to 24 engage the wire when it is stopped to form the cylindrical portion 40 on the wire 17. The vertical movement dies 21 and 22 are spaced away from the wire 17 to permit the wire to move towards the nail-making machine 13 when the feeding mechanism is operated. When the feeding mechanism stops the wore 17 the vertical movement dies 21 and 22 engage the wire 17 and compress it along opposite axes between them. Where the wire 17 is engaged by the dies 21 and 22 the noncircular cross section of the wire 17 as shown in dotted lines in FIG. 6 is transformed into a roughly circular cross section as shown in solid lines in FIG. 6 by the die heads 25 to form the cylindrical portion 40. Similarly the horizontal movement dies 23 and 24 at the second station engage the wire 17 at the already formed cylindrical portion 40 and again compress it on opposite axes to form the finished circular cross section desired.

After the cylindrical portion reshaping apparatus 12 forms the cylindrical portion 40 on the wire 17, the wire 17 is fed into the nail-making machine 13. The nail machine jaws 28 and 29 are then moved laterally towards the wire 17 and clamp the wire 17 there between approximately at the junction between the shank 39 and the cylindrical portion 40. The hammerhead 26 moves against the free end 41 of the wire 17 to form the head 42 of the nail 34. When the wire is securely held between the jaws 28 and 29, the shearing members 30 and 31 are moved laterally towards the wire 17 to form the point 38. The shearing members 30 and 31 intersect the wire 17 at the top end of the next cylindrical portion 40 on the wire 17. After the circular head 42 is formed the hammerhead of 26 is moved back to its original position and the shearing members 30 and 31 are laterally moved away from the wire 17. The jaws 28 and 29 are then laterally moved away from the nail 34 which drops into the opening 32 of the bin 33 for storage. Then the feeding mechanism operates to move the new free end 41 of the wire 17 into the nail-making machine 13 and the nail-forming operation commences again.

Alternative apparatus for use as a cylindrical portion reshaping apparatus 12 is shown in FIGS. 7 and 8. The apparatus 12 shown in FIG. 7 comprises a vertical support member 43 having a hole through its upper end to pass the wire 17 through. An axially positioned head 44 is positively rotated about the axis of the wire 17 and is supported on the support means 43 with suitable bearings. An endless belt 45 passes around the head 44 and a drive means 45 a to rotate the head 44. The driven means 45a is preferably electrically rotated when the wire 17 is stopped in its intermittent movement. Three rotatable rollers 46 are mounted on pins 47 extending outwards from the head 44. Each roller 46 is mounted at an angle to the axis of the wire 17 and the pins 47 are positioned approximately 120° apart on the head 44. Two rollers 46 are permanently fixed adjacent the outer surface of the wire 17 while the third roller 46 is automatically movable towards and away from the wire 17 to place the outer surface of the wire 17 in contact with the rollers 46 when the wire 17 is stopped in its intermittent movement. The rollers 46 preferably have flat outer circumferential surfaces approximately the same width as the length of the cylindrical portion 40 on the wire 17. The three rollers 46 apply a pressure to the wire 17 to transform the noncircular cross section of the portion 40 into a circular cross section. With the rollers 46 in contact with the wire 17 the head 44 is then rotated to form the cylindrical portion 40 on the wire 17. Preferably, the first and second guide apparatus 11 would be replaced by a type of clamping device which rigidly secures the wire 17 at two points at opposite sides of the cylindrical portion reshaping apparatus 12. The clamping device 11 would prevent the wire from twisting as the head 44 is rotated about the axis of the wire 17. The clamping device 11 would engage the wire 17 when the wire 17 is stopped in its intermittent movement and the clamping devices 11 are moved away from the wire when the wire 17 is advanced towards the nail-making machine 13 by the feed mechanism.

A second alternative apparatus is shown in FIG. 8 where the cylindrical portion reshaping apparatus 12 comprises a first pair of vertical movement rollers 48 and 49 and a second pair of horizontal movement rollers 51 and 52 which are registered a nail length away from the first pair of rollers. The roller 49 of the first pair of rollers moves vertically towards and away from the wire 17 while the roller 48 is pivotally secured on a support means 50. When the wire 17 is stopped in its intermittent movement, the roller 49 is moved towards the wire 17 to engage the outer surface of the wire 17 between the grooves 54 of the rollers 48 and 49. The grooves 54 should be of a sufficient width to engage half the outer surface of the wire 17 and change the noncircular cross section to a circular cross section for the cylindrical portion 40 of the wire 17. The first pair of rollers when in engagement with the wire 17 are moved in a direction shown by an arrow 55 along the wire 17 for the length of the desired cylindrical portion 40. The roller 49 is then moved away from the wire 17 and the wire 17 is advanced again towards the nail-making machine 13.

Similarly, roller 51 is moved horizontally towards and away from the wire 17 while the roller 52 is pivotally mounted to a support apparatus 53. The roller 51 is moved towards the wire 17 when the wire 17 is stopped in its intermittent movement. The grooves 54 in the outer surface of the rollers 51 and 52 engage the outer surface of the wire 17 and transforms the noncircular cross section to a circular cross section for the cylindrical portion 40. When the second pair of rollers 51 and 52 are in engagement with the wire 17, the rollers are moved in a direction shown by the arrow 55 along the wire 17 for the length of the desired cylindrical portion 40. The first and second pair of rollers operate in synchronism to engage the wire 17 at the same item and moved along the wire 17 the same distance for the same length of time. The rollers 49 and 51 are then moved away from the wire 17 to permit the wire 17 to be advanced towards the nail-forming machine 13. The rollers then are returned back to their original position to be placed in engagement with the wire 17 when the wire 17 is stopped in its intermittent movement again.

It should be noted that the phrase "a nail length" used herein above in connection with this invention is taken to mean: the length of the shank from the point to the start of the cylindrical portion and the length of the cylindrical portion which is formed into the circular head of the nail.

It should be noted that there are many alternative ways of forming the cylindrical portion 40 on the wire 17 and this invention is directed towards an apparatus and method of making nails having substantially flat circular heads and a shank with a general cross-sectional shape which is noncircular from wire which is of said noncircular cross section along its length, and which comprises: unwinding drawn wire from a roll of wire and advancing the wire by an intermittent drive means; passing said wire through guide means to provide a straight length of wire; engaging a portion of said wire with die means to form a cylindrical portion on the wire with a general cross-sectional shape which is circular, said cylindrical portion having the length substantially sufficient to form the head of the nail; feeding the wire into a nail-making machine wherein the cylindrical portion is formed into the circular head of the nail therein; shearing the nail off at the end of the shank to form the nail; and all of the aforesaid steps being arranged to take place simultaneously at different spaced locations along the wire while the same is stationary, said different spaced locations being spaced apart by one or more nail lengths of wire.

The invention is not be be taken as limited to any of the specific features described herein but comprehends all such variations as come within the spirit and scope of the appended claims.

1. A method of making nails having substantially flat circular heads and a shank with a general cross-sectional shape which is noncircular from wire which is of said noncircular cross section along its length, and which comprises:
  unwinding drawn wire from a roll of wire and advancing said wire by an intermittent drive means;
  passing said wire through guide means to provide a straight length of wire;
  reshaping a portion of said wire by applying compressive forces thereto along at least three axes angularly spaced from one another around longitudinal axis of said wire, by means of angularly spaced die means to form a cylindrical portion on said wire with a general cross-sectional shape which is circular, said cylindrical portion having a length substantially sufficient to form the head of the nail;
  feeding said wire into a nail-making machine wherein said cylindrical portion is formed into said circular head of the nail therein;
  shearing the nail off at the end of the shank to form the nail; and
  all of the aforesaid steps being arranged to take place simultaneously at different spaced locations along said wire while the same is stationary, said different spaced locations being spaced apart by one or more nail lengths of wire.

2. A method as described in claim 1 wherein the step of forming the cylindrical portion includes the step of engaging said wire on opposite sides by two pairs of die means, one pair being spaced apart a nail length from the other and positioned to engage and compress said wire at 90° angles to each other and each pair being arranged in opposition and being relatively movable on opposite axes towards and away from one another whereby to apply compressive forces to said wire along four angularly spaced axes.

3. A method as described in claim 1, wherein the step of forming the cylindrical portion includes the step of engaging said wire between the outer surfaces of at least three rotatable rollers spaced 120° apart and permitting the rollers to rotate about the longitudinal axis of said wire.

4. A method as described in claim 1, wherein the steps of forming the cylindrical portion includes the step of successively engaging said wire between first and second pairs of rollers angularly displaced from one another and permitting the rollers to move along the longitudinal axis of the wire a predetermined distance while applying compressive forces thereto.

5. A method as described in claim 1, wherein the shearing of the wire takes place at about the forward end of the cylindrical portion to free the already formed nail and expose substantially the entire length of said cylindrical portion for formation of the circular head of the next nail.

6. An apparatus for making nails having substantially flat circular heads and a shank of general cross-sectional shape which is noncircular from wire which is of said noncircular cross section along its length, and in which said wire is intermittently advanced by a drive means from a rotatably mounted roll of wire towards a nail-making station comprising, the combination of:
  a plurality of axially aligned guide means spaced apart from one another and adapted to hold a length of wire therebetween;
  wire-compressing die means located between said guide means being relatively movably mounted and operated to move towards and away from said wire along at least three axes angularly spaced apart from one another to apply compressive forces thereto;
  means for operating said die means when said wire is stopped whereby to engage and compress said wire to form a cylindrical portion with a general cross-sectional shape which is circular and with a length substantially sufficient to form the head of the nail said die means moving away from said wire when the same is being advanced; and a nail-making machine at said nail-making station wherein said cylindrical portion formed into the circular head of the nail and said wire is sheared at the end of the shank to form a nail.

7. An apparatus as described in claim 6, wherein said die means comprise a first pair of relatively movable dies arranged on opposite axes and operable to engage and compress said wire on opposite sides when said wire is stopped and a second paid of relatively movable dies registered a nail length away from said first pair of dies and angularly positioned on opposite sides of the wire and being operable on opposite axes to engage and compress said wire at 90° angles to said first pair of dies when said wire is stopped to form the cylindrical portion and both said first and second pair of dies being operable to move away from said wire when said wire is advanced.

8. An apparatus as described in claim 6, wherein said die means comprise;
- a first and second roller spaced 120° apart from one another and support member and a third roller associated with said member and spaced 120° apart from each of said first or second rollers and adapted to be moved towards said stopped wire and said first and second roller to engage said wire between the outer surface of said first, second, and third rollers;
- means adapted to rotate said rollers about the longitudinal axis of said wire;
- means adapted to prevent said wire from twisting; and
- means adapted to move said third roller away from said wire when said wire is advanced.

9. An apparatus as described in claim 6 wherein said die means includes;
- a pair of rollers positioned on opposite sides of said wire in a normal position and operable to engage and compress said wire when said wire is stopped;
- means operable to move said pair of rollers along the longitudinal axis of said wire a predetermined distance when said wire is stopped; and
- means operable to move said pair of rollers away from said wire when said wire is advanced and return said pair of rollers to the normal position.

10. An apparatus as described in claim 6, wherein said die means comprise:
- a first pair of rollers positioned on opposite sides of said wire in a normal position and adapted to engage and compress said wire when said wire is stopped;
- means operable to move said first pair of rollers along the longitudinal axis of said wire a predetermined distance when said wire is stopped;
- means operable to move said first pair of rollers away from said wire when said wire is advanced and return said first pair of rollers to the normal position;
- a second pair of rollers registered a nail length away from said first pair of rollers and adapted to engage and compress said wire when said wire is stopped, and being angularly positioned on opposite sides of said wire in a normal position to engage said wire at 90° angles to said first pair of rollers;
- means operable to move said second pair of rollers along the longitudinal axis of said wire a predetermined distance when said wire is stopped; and
- means operable to move said second pair of rollers away from said wire when said wire is advanced and return said second pair of rollers to the normal position.